United States Patent [19]

Tuck et al.

[11] Patent Number: 5,382,086
[45] Date of Patent: Jan. 17, 1995

[54] VEHICULAR ANTILOCK BRAKE SYSTEM INCORPORATING IMPROVED ADAPTIVE CONTROL FEATURE

[75] Inventors: Brian Tuck, Ann Arbor; Peter Schnerer, Dearborn Heights, both of Mich.

[73] Assignee: Kelsey-Hayes Company, Romulus, Mich.

[21] Appl. No.: 237,291

[22] Filed: May 3, 1994

[51] Int. Cl.$^6$ ............................................. B60T 8/32
[52] U.S. Cl. ................................... 303/100; 303/103; 303/106; 303/109; 303/110
[58] Field of Search ............... 303/103, 102, 100, 105, 303/106, 109, 110, 20, 96, 97, 98, 99; 364/426.01, 426.02, 426.03; 188/181 C

[56] References Cited

U.S. PATENT DOCUMENTS

| | | | |
|---|---|---|---|
| 4,054,328 | 10/1977 | Leiber et al. | 303/103 |
| 4,865,399 | 9/1989 | Atkins et al. | 303/110 X |
| 5,071,200 | 12/1991 | McNinch, Jr. | 303/110 |

*Primary Examiner*—Douglas C. Butler
*Attorney, Agent, or Firm*—Fitzpatrick, Cella, Harper & Scinto

[57] ABSTRACT

An antilock brake system selectively, controllably applies and relieves braking force to and from a vehicle wheel. The system determines when the wheel exhibits a tendency to lock during the application of braking force, and when the wheel recovers from its tendency to lock after relief of braking force, and calculates a tuner time which represents the time elapsed between when the wheel recovers from one tendency to lock and when the wheel exhibits its next tendency to lock. When the wheel exhibits a tendency to lock, the braking force is initially relieved, and is thereafter increased as a function of the tuner time from a previous cycle.

30 Claims, 5 Drawing Sheets

VEHICULAR ANTILOCK BRAKE SYSTEM INCORPORATING IMPROVED ADAPTIVE CONTROL FEATURE

BACKGROUND OF THE INVENTION

1. Field of the Invention

Antilock brake systems ("ABS") have been developed to reduce the stopping distance and improve the stability of vehicles during braking. In these systems, the braking force at a wheel is modulated when the wheel is about to lock up, so that the wheel may spin freely and engage the surface fictionally again. This modulation is performed each time the wheel is about to lock, thereby constituting an ABS control cycle. A full antilock brake stop ordinarily consists of several such ABS control cycles.

To optimize braking performance, some of these systems attempt to modulate the braking force as a function of some of the braking conditions encountered. For example, more braking force may be applied to a wheel travelling on a surface having a relatively high coefficient of friction, such as dry pavement, than to a wheel travelling on a surface having a relatively low coefficient of friction, such as ice. Many braking conditions, however, can vary significantly from stop to stop, and even from ABS control cycle to ABS control cycle in a given stop. Furthermore, while some of these varying conditions (such as surface conditions) can be assessed and compensated for directly, others cannot be determined easily, or cannot be determined at all. These unknown parameters, if not compensated for, can greatly compromise the effectiveness of the antilock brake system.

Accordingly, the present invention generally relates to an antilock brake system that incorporates an adaptive control feature to compensate for these unknown parameters. More specifically, this invention relates to an antilock brake system that modulates the brake pressure at a slipping wheel in one ABS cycle as a function of the behavior of that wheel in previous cycles to correct for deviations from optimal performance, and thereby to reduce the stopping distance and improve the stability of the vehicle during the stop.

2. Description of the Prior Art

Antilock brake systems usually include sensors for determining the rotary speed of at least two of the wheels of the vehicle. These wheels speeds are compared with a calculated vehicle reference speed. If during braking the rotational speed of a wheel is determined to be less than the calculated vehicle speed by more than some threshold amount, called the "slip threshold", that wheel is determined to be "slipping" or "exhibiting a tendency to lock up." The ABS then modulates the brake force, usually supplied by pressurized fluid like hydraulic fluid, applied to the wheel so as to permit the wheel again to engage the road surface fictionally and recover its speed. This process is repeated by the ABS, thus periodically "pumping" the brake to bring the vehicle to a stop.

(It should be noted that other schemes are known for determining that a wheel is exhibiting a tendency to lock. For example, rather than comparing the wheel speed with a calculated vehicle reference speed, it is known to measure wheel deceleration as an equivalent indicator of impending lock-up. Nevertheless, the present invention is not limited to any particular scheme for determining wheel lock-up.

In addition, the terms "brake force" and "brake pressure" will be used generically in this specification to refer to hydraulic brake pressure and other force applying mechanisms.)

In conventional antilock brake systems, the braking force at a wheel that exhibits a tendency to lock is typically first reduced to allow the wheel to accelerate back up toward the vehicle speed (or "spin-up"), then is held constant, and finally is increased at a controlled rate. In some of these systems, the rate of pressure increase is varied to account for surface conditions. For example, British Patent No. 1,251,892 (assigned to Messier) relates to a brake control system that determines the coefficient of friction between the wheel and the road by assessing the acceleration of the wheel as it spins-up. If the wheel acceleration is high, the system determines that the coefficient of friction is relatively high, and accordingly increases the brake pressure at a rapid rate. On the other hand, if the acceleration is low, the system determines that the coefficient of friction is low, and increases the brake pressure more gradually.

However, there are many other vehicle and wheel parameters that vary significantly over time. Many of these parameters, such as, for example, tire wear, tire pressure, brake wear, vehicle loading and master cylinder pressure, are not readily observable by sensors on the vehicle, and are therefore not commonly available as inputs to an antilock brake control system. These parameters, while not directly observable, all affect the performance of the antilock brake control system. Thus, it would be desirable to have an antilock brake system that could compensate for these parametric variations without directly measuring them.

U.S. Pat. No. 4,054,328 (Leiber et al.) relates to an antilock brake control system that uses adaptive control (or "feedback") in an attempt to modulate ideally the rate at which brake pressure is reapplied to a wheel that has recovered from an impending locking condition. In accordance with this system, brake pressure is reapplied to the wheel in a steep pressure increase period followed by a more gradual pressure increase period, with the duration of the steep pressure period in one ABS control cycle being varied in dependence on the duration of the gradual pressure increase period in the immediately preceding ABS cycle. Hence, this system purports to achieve optimal control of the brake pressure by measuring how long pressure was applied to the wheel in one control cycle, and by using that measurement to determine how the pressure will be applied to the wheel in the following control cycle.

Prior art systems such as those described in the patents mentioned above do not provide entirely satisfactory results, because they do not use parameters that give accurate indications of the past behavior of the wheel. Therefore, there is a need to develop a substantially improved control scheme for ABS that departs from past, outmoded approaches.

SUMMARY OF THE INVENTION

It is accordingly a general object of the present invention to provide a new adaptive control scheme in an antilock brake system that takes an entirely fresh approach, departing significantly from the concepts and teachings of the prior art, in order to provide improved results.

It is a further object of the present invention to provide an antilock brake system that uses a new type of adaptive control to compensate for varying but not directly measured and therefore unquantified braking conditions encountered by the vehicle and thereby to achieve optimal performance of the wheel.

It is a more specific object of the present invention to provide an antilock brake system wherein, when a wheel of a vehicle exhibits a tendency to lock in one ABS control cycle, the braking pressure at that wheel is first reduced and then increased at a controlled rate which depends upon the behavior of that wheel in the preceding ABS control cycle.

To achieve these objectives and in accordance with the purpose of the invention, as embodied and described herein, the antilock brake system incorporating an improved adaptive control feature according to the present invention includes a brake device for selectably, controllably applying and relieving braking force to and from a wheel. A first signal processor determines when the wheel exhibits a tendency to lock during application of braking force thereto by the brake device. A second signal processor determines when the wheel recovers from its tendency to lock after relief of braking force therefrom. A clock, responsive to the second and first signal processors, calculates a quantity called "tuner time," which represents the time elapsed between (a) when the wheel recovers from its tendency to lock, as determined by the second signal processor, and (b) when the wheel next exhibits a tendency to lock, as determined by the first signal processor. A control device is responsive to the first signal processor and also to the clock to reduce the braking pressure when the wheel exhibits a tendency to lock, and thereafter to increase the braking pressure at a controlled rate that is a function of the tuner time from the preceding ABS cycle.

More particularly, this embodiment includes a sensor that detects the speed of a wheel. The first signal processor, responsive to the output of the sensor, generates a signal representative of the slip of the wheel, namely the difference between the speed of the wheel and a calculated vehicle reference speed, and determines that the wheel is exhibiting a tendency to lock when the slip signal exceeds a particular slip threshold. As a possible alternative, the signal processor may respond to the output of the sensor to generate a signal representing the deceleration of the wheel, and in such case will determine that the wheel is exhibiting a tendency to lock when the deceleration signal exceeds some deceleration threshold. The second signal processor, also responsive to the output of the sensor, generates signals representing the acceleration of the wheel, and determines that the wheel has recovered from its tendency to lock when the wheel stops accelerating.

The control device monitors the output of the first signal processor and in conjunction with the clock produces a time signal representative of the time period between when the wheel recovers from one tendency to lock (namely when the wheel stops accelerating) until the time when the wheel exhibits its next tendency to lock (namely when the slip of the wheel exceeds the slip threshold). Again this time signal may be called the "tuner time." The control device, in response to the first signal processor and the tuner time signal, modulates the braking pressure at the wheel. In particular, the control device reduces the braking pressure when the wheel exhibits a tendency to lock, and thereafter increases the braking pressure at a controlled rate that is a function of the tuner time from the immediately preceding ABS control cycle.

It has been found that the tuner time provides a more accurate indication of how the wheel has actually been behaving in preceding control cycles than do other parameters used to modulate braking pressure in the prior art. Thus, the present invention provides improved antilock braking control.

These and other objects, aspects, features and advantages of the present invention will become apparent from the following detailed description taken in conjunction with the accompanying drawings.

BRIEF DESCRIPTION OF THE DRAWINGS

FIG. 6 is a block diagram illustrating a method of computing a pulse width scaling factor according to a preferred embodiment of the present invention.

DESCRIPTION OF THE PREFERRED EMBODIMENTS

A detailed description of the present preferred embodiments of the invention, examples of which are illustrated in the accompanying drawings, will now be provided. Wherever possible, the same reference numbers will be used throughout the drawings to refer to the same or like elements.

Figure 1:
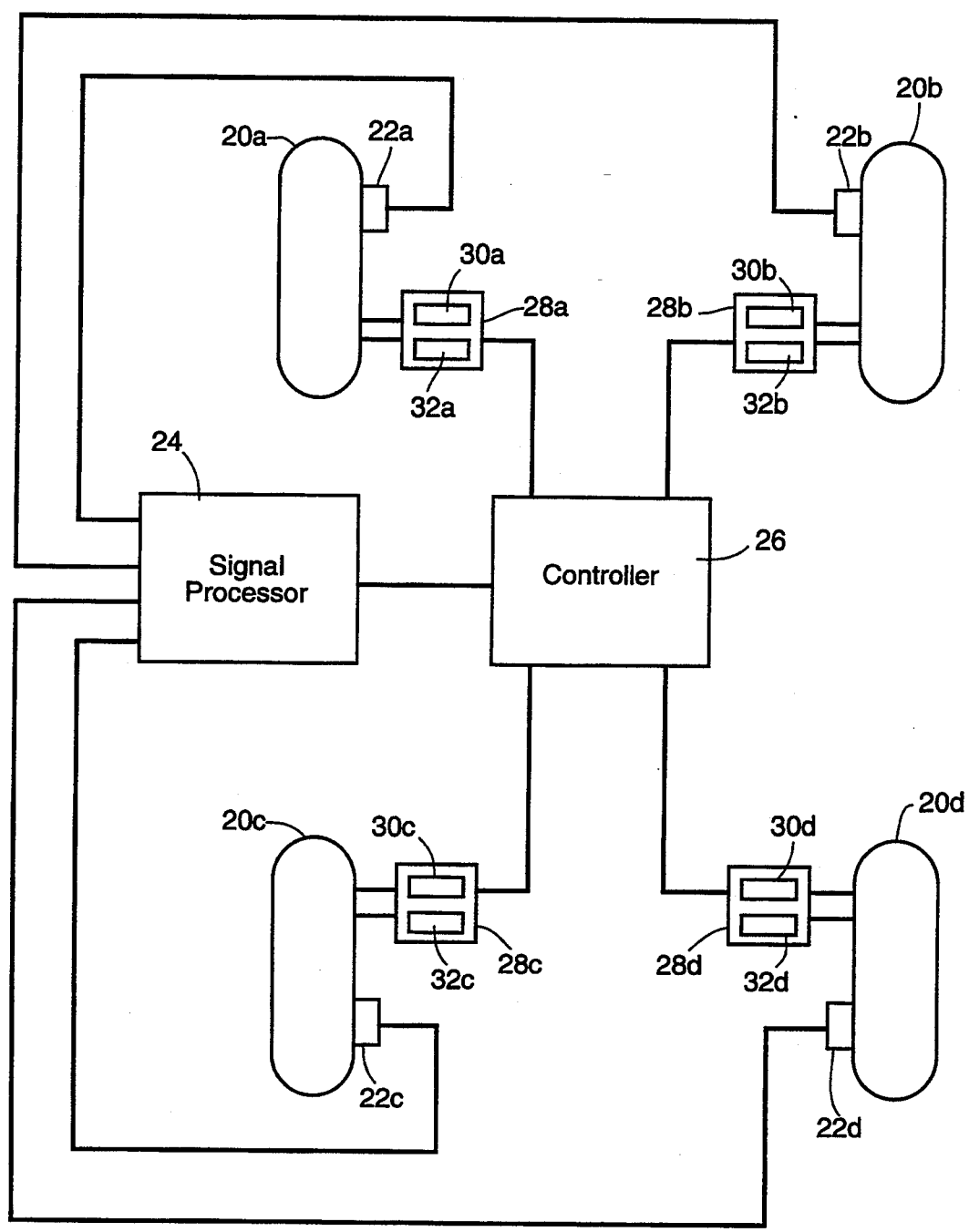
FIG. 1 is a schematic diagram of a vehicular antilock brake system incorporating an improved adaptive control feature according to a preferred embodiment of the present invention.

The antilock brake system incorporating an improved adaptive control feature in accordance with the present invention controls the braking of a vehicle by controlling the amount of braking pressure applied to at least one wheel. FIG. 1 is a schematic diagram of an embodiment of the present invention used in a vehicle having four wheels. As is shown, four controlled wheels 20a, 20b, 20c and 20d are operatively connected to four wheel speed sensor 22a, 22b, 22c and 22d, respectively, which, in turn, are operatively connected to a signal processor 24, which may be incorporated into a microprocessor. Of course, the antilock braking system of the present invention may be applied to a vehicle having any number of wheels. Moreover, it is possible to control only some of the wheels on a vehicle, and to leave the remaining wheels uncontrolled.

As is further shown in FIG. 1, the signal processor 24 is also coupled to a controller 26, which, in turn, is operatively connected to a brake devices 28a, 28b 28c and 28d. The controller 26 may also be incorporated into the microprocessor. As is known in the art, the brake devices 28a, 28b, 28c and 28d each comprise, as part of the ABS, a three-way brake valve structure.

These structures respectively include pressure apply or isolation valve 30a, 30b, 30c and 30d that control supply of pressurized fluid, like hydraulic fluid, from a pedal-actuated master cylinder (not shown) to the associated brake, and pressure relief or dump valves 32a, 32b, 32c and 32d that control relief of pressurized fluid from that brake to a reservoir or accumulator (also not shown). An example of such a brake valve structure is disclosed in U.S. Pat. No. 4,828,335 (Fuller et al.), which is assigned to the assignee of the present invention and is incorporated herein by reference.

When the isolation valve in any one brake device is open and the dump valve is closed, fluid pressure from the master cylinder to the brake is increased. When both the isolation and dump valves are closed, fluid pressure to the brake is maintained constant because the brake is isolated from the master cylinder and the accumulator. When the dump valve is open and the isolation valve is closed, fluid pressure to the brake is relieved because the brake is isolated from the master cylinder but not the accumulator. Moreover, in digital systems the dump and isolation valves can be controlled by application of respective pressure dump and pressure apply pulses, the duration and frequency of which thus control brake pressure application and relief to and from the associated wheel. Thus, the control of the brake valve structure permits precise modulation of the brake pressure.

It is also noted that wheel speed sensors 22a, 22b, 22c and 22d may comprise, for example, a variety of known suitable transducers for generating electrical signals representative of various parameters associated respectively with wheels 20a, 20b, 20c and 20d. These sensors may comprise, for example, a stationary variable reluctant sensor positioned adjacent a toothed wheel which rotates with its respective vehicle wheel. The variable reluctant sensor generates a pulsed signal the frequency of which varies directly with the speed of the wheel. The speed signals generated by the sensors 22a, 22b, 22c and 22d and representative of the speed of each wheel may be denoted $v_{wa}$, $v_{wb}$, $v_{wc}$ and $v_{wd}$, respectively. These speed signals $v_w$, as well as any other signal generated by a wheel speed sensor 22, may be generated continuously or intermittently. If generated intermittently, the signals must be generated at a rate high enough to permit the controller 26 to effectively control the brake devices 30a, 30b, 30c and 30d, as will be discussed in detail below.

Signal processor 24 receives the speed signals $v_w$ from wheel speed sensors 22a, 22b, 22c and 22d and, in a preferred embodiment of the invention, may calculate the slip of the respective wheels 20a, 20b, 20c and 20d, using the speed signals $v_w$, to indicate that a wheel is exhibiting a tendency to lock. Slip may be defined as the difference between a wheel speed, represented by $v_w$, and the estimated speed of the vehicle. The vehicle speed can be calculated by the signal processor 24 as a vehicle reference speed in any number of known ways. For example, the vehicle can be equipped with an unbraked wheel specifically for that purpose, or the vehicle reference speed can be calculated from the speed, as indicated by at least one of the signals $v_w$, of one or more usually braked wheels.

Further, it is again to be understood that other schemes for determining when a wheel exhibits a tendency to lock, for example, such as those based on wheel deceleration, are within the scope of the present invention. In such schemes, the signal processor 24 is arranged to calculate deceleration signals $b_{wa}$, $b_{wb}$, $b_{wc}$, and $b_{wd}$ for the wheels by differentiating the wheel speed signals $v_w$. These deceleration signals $b_w$ are then each compared by the signal processor with a deceleration threshold, which if exceeded indicates that a wheel is tending to lock.

For convenience, the description of the invention will be made in the context of the determination of impending wheel lock by determination of slip. Thus, the slip signals generated by the signal processor 24, which may be represented as $\lambda_a$, $\lambda_b$, $\lambda_c$ and $\lambda_d$, will be monitored to determine when the wheel exhibits a tendency to lock during braking. That is, when the wheel slip $\lambda$ for a given wheel exceeds a predetermined slip threshold, the signal processor will determine that wheel is exhibiting a tendency to lock. Such slip threshold may, for example, be fixed or variable as a function of other system parameters.

Signal processor 24 may also calculate other parameters indicative of the braking performance of the vehicle. For example, as noted, the deceleration of the wheel may be determined as a function of the wheel speed signals $v_w$. Still other signals may also be generated by signal processor 24.

Once a wheel exhibits a tendency to lock, the antilock brake system according to the present invention controls or modulates the pressurized fluid application to the brake device associated with that wheel. More particularly, the braking pressure will be reduced when the wheel exhibits a tendency to lock, and will thereafter be increased at a controlled rate. In determining this controlled rate, the system in accordance with the present invention evaluates parameters relating to the behavior of the wheel in the previous control cycle and employs that evaluation to calculate the actual rate of pressure increase.

The system according to this invention, does not use, in such control, any parameters that measure how the brake devices were controlled in previous control cycles, such as the time during which brake pressure was applied to the wheel, because such parameters do not provide an accurate indication of wheel behavior. Rather, such prior schemes merely measure how the system is attempting to control the wheel rather than how to wheel is responding to such control. Rather, the system of the present invention directly assesses how the wheel has behaved previously in response to such ABS control, and uses the results of that assessment to control thereafter the behavior of the wheel in the present cycle. Such control compensates for parametric variations that are difficult or impossible to measure directly during an ABS stop, such as variations in tire wear, tire pressure, brake wear, vehicle loading, master cylinder pressure and the like. Therefore, the adaptive control system in accordance with the invention results in a more effective antilock brake system.

Figure 2A:
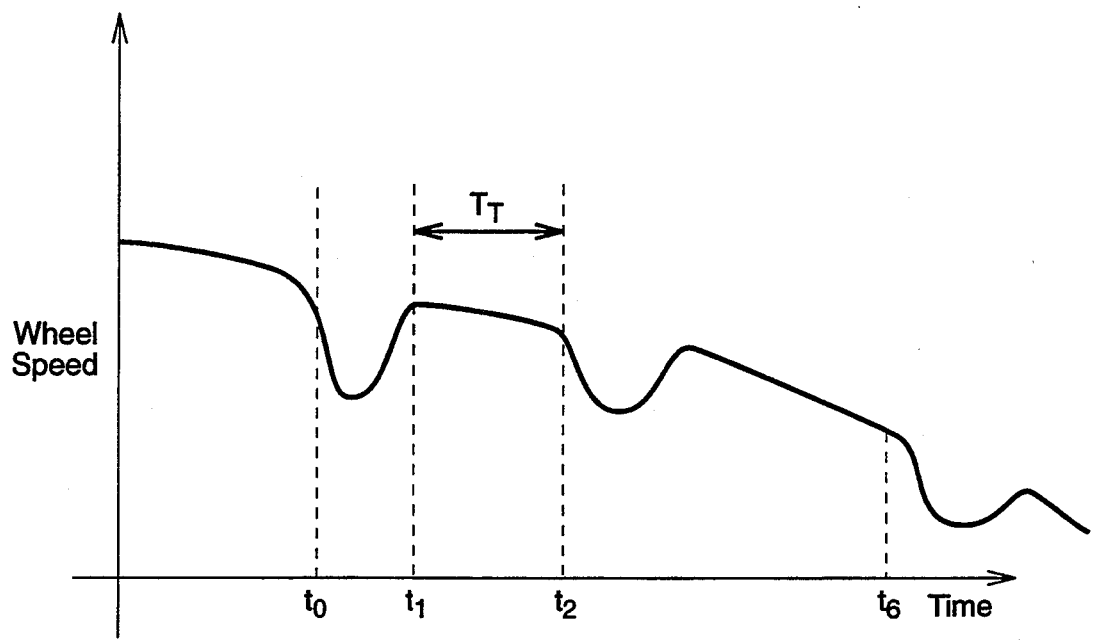
FIG. 2a is a graph of wheel speed versus time over several ABS control cycles according to a preferred embodiment of the present invention.

The parameter utilized in accordance with the present invention may called the "tuner time," denoted as $T_T$, from the preceding ABS cycle. Referring to FIG. 2a, which depicts wheel speed versus time over the course of an ABS stop, an ABS cycle for purposes of this explanation will be considered to be from when the wheel exhibits a tendency to lock ($t_0$), as determined by the signal processor, through the recovery of the wheel from such tendency ($t_2$), until the wheel again exhibits such tendency ($t_2$). Tuner time $T_T$ is defined as beginning when the wheel recovers from the tendency to lock ($t_1$), as judged when the wheel stops accelerating.

Tuner time is further defined as ending when the wheel next exhibits a tendency to lock ($t_2$).

Accordingly, the invention contemplates controlling the rate of pressure increase in one ABS cycle as a function of the tuner time $T_T$ in the preceding ABS cycle. Thus, in a preferred embodiment, the controller 26 is coupled to the signal processor 24 and is responsive to signals generated by it. As noted, these signals include a wheel speed signal $v_w$, a slip signal $\lambda$, and a signal representing the tuner time $T_T$ from the preceding cycle. In response to the signals received from the signal processor 24, the controller 26 controls the brake devices 28 by opening and closing the isolation and dump valves. Typically, the isolation and dump valves are operated by solenoids. Therefore, control can be accomplished by applying control pulses to the solenoids associated with either of the respective isolation and dump valves. Adjusting either the length of time or the frequency of such pulses permits the brake pressure to the wheel to be accurately modulated. And by controlling the application of brake pressure to the wheel in accordance with the invention, the antilock brake system can compensate for the parametric variations that cannot be measured, at least conveniently as discussed above. Thus, the ABS adaptive control according to the present invention can thereby optimally control the behavior of the wheel.

An operation of the antilock brake control system in accordance with preferred embodiment of the present invention will now be described in detail in connection with FIGS. 2a through 6. Referring first to the flowchart of FIG. 3, the braking operation in an ABS control cycle for one of the wheels 20 undergoing ABS control will be generally described. As is shown, the ABS cycle begins when the system determines that the wheel is exhibiting a tendency to lock (step S40). This condition, as discussed above, may be satisfied when the wheel slip exceeds a slip threshold or when the wheel deceleration exceeds a deceleration threshold. Preferably, the condition is not satisfied until both the wheel slip and the wheel deceleration are excessive. A time delay might also be included, such that the system will repeatedly cycle through step S40 for a fixed or variable amount of time after the tendency of the wheel to lock is first recognized.

Once the tendency to lock is seen, immediately or after the noted time delay, the system branches to step S42 and initiates brake pressure reduction. Specifically, the isolation valve 30 is closed and the dump valve 32 is opened. In a more preferred embodiment, pressure is reduced by alternately opening and closing the dump valve with a series of pulses to provide for a controlled release of brake pressure. Other means of reducing the brake pressure may also be used. The specific amount of brake pressure that will be reduced in step S42 will in general be a function of the behavior of the wheel in the previous ABS cycle.

Once the appropriate amount of braking pressure has been released, the system will hold the brake pressure constant by closing both isolation valve 30 and dump valve 32 (step S44). The period during of which pressure is held constant (the "constant pressure period") continues until the criteria for pressure application are satisfied (step S46). In general, in a preferred embodiment of the present invention, these pressure application criteria are satisfied either when the wheel achieves a predetermined high acceleration during its spin-up, or a delay period after the wheel slip becomes less than a slip threshold. This delay period can be fixed, or can be a function of parameters indicative of the wheel's behavior, such as, for example, wheel acceleration, wheel slip time (i.e. the amount of time that the wheel slip exceeds the threshold in one ABS control cycle), wheel slip depth (i.e. the maximum value of wheel slip in that control cycle), wheel recovery rate and the time during which pressure is dumped by the brake device ("pressure dump time"). Wheel input oscillations may also be considered, as well as the status of the drivetrain if the antilock brake system is being used on a vehicle having four-wheel drive. Once the pressure application criteria are satisfied, the antilock brake system will increase the braking pressure at the wheel at a controlled rate that is a function of the tuner time from the preceding ABS cycle (step S48). This controlled rate of pressure application may be accomplished by keeping the dump valve 32 in the closed position, and by alternately opening and closing the isolation valve 30 with a series of pressure application pulses to achieve an overall rate that is a function of the width and frequency of those pulses. In a preferred embodiment of the invention, the brake pressure is increased first at a rapid rate in a primary apply stage (preferably comprising at least two primary pressure apply pulses), and then at a more gradual rate in a secondary apply stage (preferably comprising a series of smaller secondary pressure apply pulses). Pressure increase continues until the wheel exhibits another tendency to lock, at which time the next ABS cycle begins.

Figure 2B:
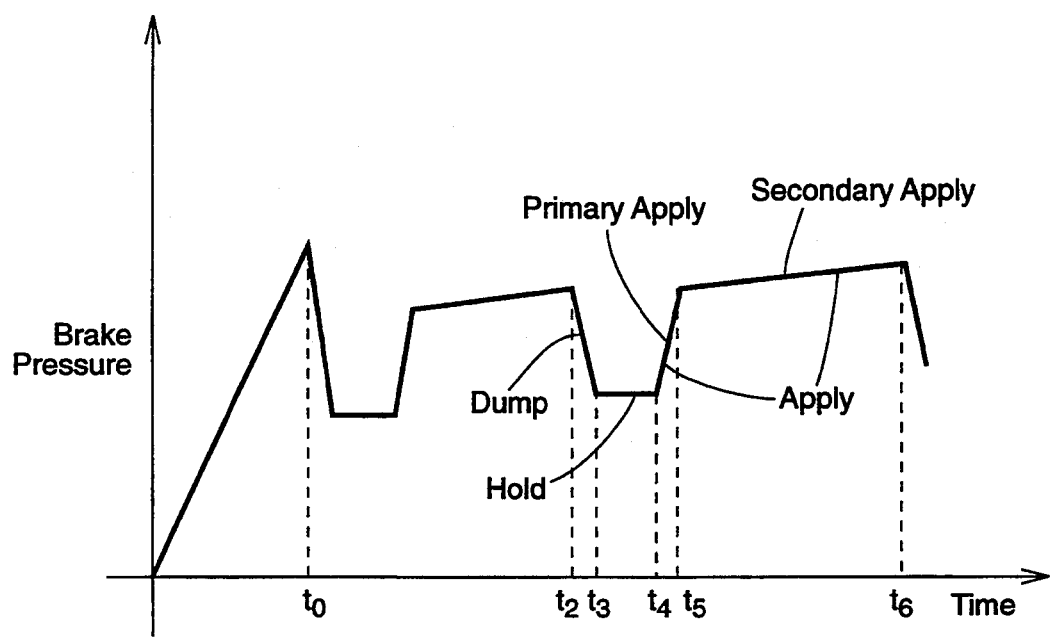
FIG. 2b is a graph of brake pressure versus time over several ABS control cycles according to a preferred embodiment of the present invention.
Figure 3:
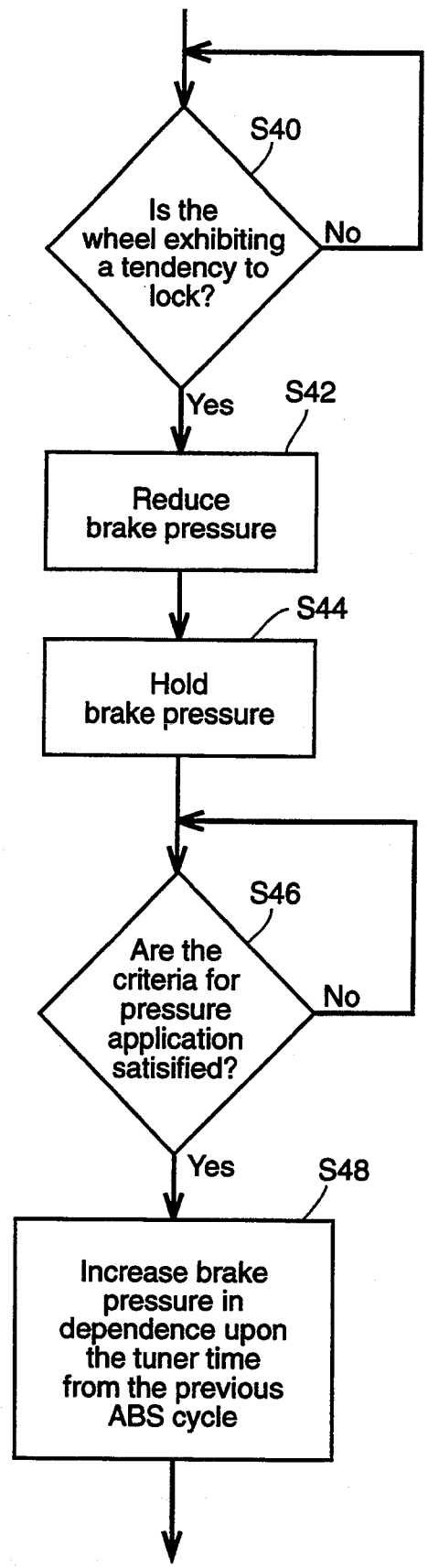
FIG. 3 is a flowchart illustrating an ABS control cycle according to a preferred embodiment of the present invention.

FIG. 2b, which corresponds in time with FIG. 2a, illustrates the modulation of the brake pressure at a wheel that is controlled in accordance with the present invention. The second ABS cycle begins at time $t_2$, when the wheel exhibits it second tendency to lock. At that time, the brake pressure is first dumped (times $t_2$ to $t_3$) and then held constant (times $t_3$ to $t_4$). At time $t_4$, the criteria for pressure application are satisfied, and the primary apply stage (time $t_5$ to time $t_6$) and secondary apply stage (time $t_5$ to $t_6$) are initiated. The secondary apply stage lasts until the wheel next exhibits a tendency to lock (time $t_6$).

Figure 4:
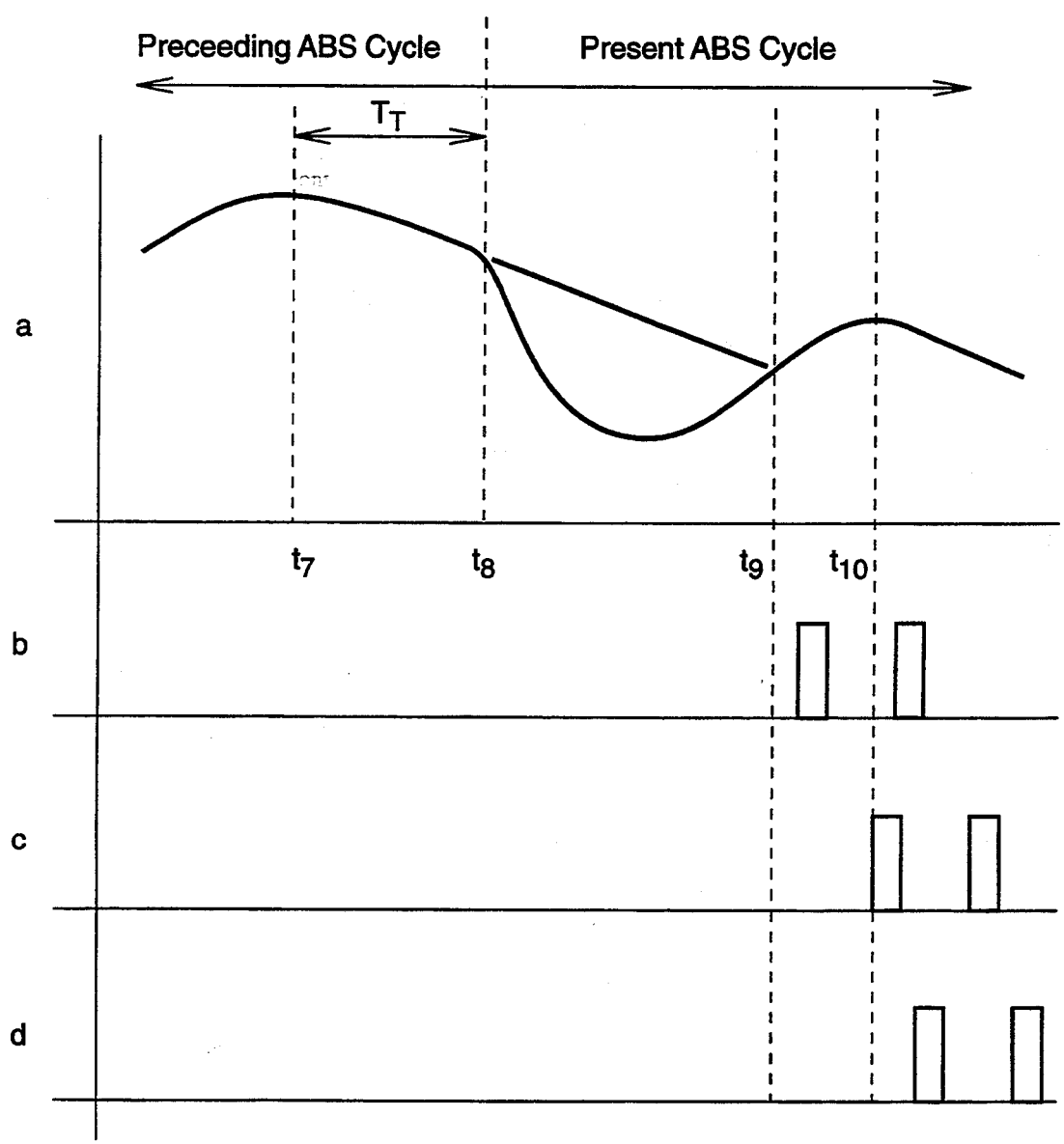

As discussed above, the actual time at which pressure application begins is dependent upon the behavior of the wheel. Such control is illustrated in FIG. 4. In that figure, the present ABS cycle begins at time $t_8$, when the wheel slip exceeds the slip threshold, and continues through time $t_9$, when the wheel slip becomes less than some threshold, and time $t_{10}$, when the wheel stops accelerating. Because the primary apply stage is in general initiated some delay period after time $t_9$, it is possible for the primary apply pulses to occur before time $t_{10}$ (FIG. 4(b)), coincidentally at time $t_{10}$ (FIG. 4(c)) or after time $t_{10}$ (FIG. 4(d)), depending on the specific pressure apply criteria that are selected, and depending upon the actual behavior of the wheel.

In accordance with the present invention, however, the measurement of the tuner time in a given ABS cycle will always begin when the wheel stops accelerating, regardless of when pressure application begins. Thus, as shown in FIG. 4(a), the tuner time $T_T$ in the preceding ABS cycle is measured from time $t_7$, which is the time at which the wheel stops accelerating, to time $t_8$, which is the time at which the next wheel speed departure occurs. Similarly, the measurement of the tuner time in the present ABS cycle begins at time $t_{10}$, irrespective of whether the pressure is applied as shown in FIG. 4(b), 4(c) or 4(d). And, in accordance with the pressure invention, the rate of pressure application in one ABS cycle is always varied as a function of the tuner time in the preceding ABS cycle.

In a preferred embodiment of the present invention, the rate of pressure application is varied in this way by varying the widths of the primary apply pulses as a function of the tuner time determined for the preceding ABS control cycle and by keeping the widths of the secondary apply pulses fixed. It is to be understood, however, that other schemes for varying the rate of pressure application as a function of the prior ABS cycle tuner time are within the scope of this invention. For example, the widths of all the apply pulses may be varied as a function of the tuner time. Alternatively, the widths of all the apply pulses may be fixed and the spacing of the pulses may be varied inversely as a function of the tuner time. Still other possibilities exist as well.

Figure 5:
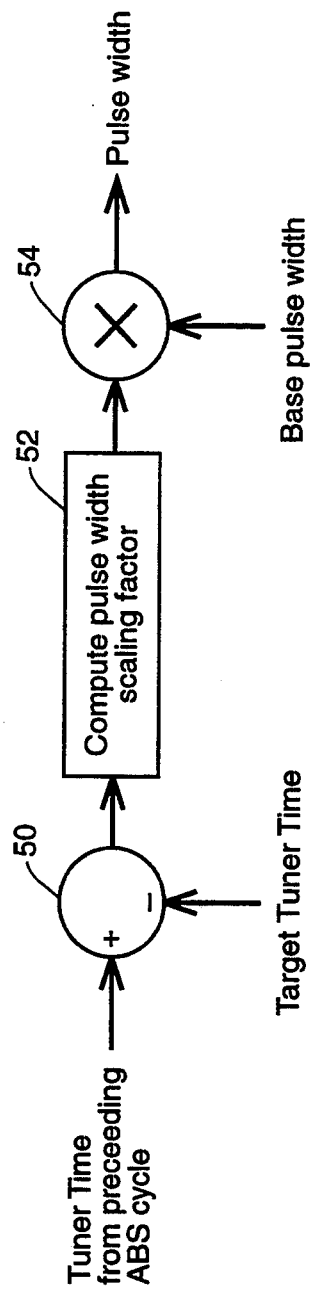
FIG. 5 is a block diagram illustrating a method of computing the width of the primary pressure apply pulses according to a preferred embodiment of the present invention.

FIG. 5 is a schematic block diagram illustrating how the primary apply pulse widths may be computed to depend upon the tuner time from the preceding ABS cycle in accordance with a preferred embodiment of the invention. As is shown, subtractor 50 initially computes an error signal that represents the difference between a predetermined target tuner time and the actual tuner time measured in the preceding ABS cycle. Block 52 then computes a pulse width scaling factor on the basis of this difference. The scaling factor is then multiplied by a base apply pulse width in multiplier 54, with the resultant product being used as the width of the pulse that controls brake pressure application. In an alternative embodiment, the scaling factor might be added to the base apply pulse width in an adder, with the resultant sum being used as the pulse width. In any event, the base apply pulse width may be fixed or, more preferably, may be calculated to take into account the dynamics of the brake valves and the vehicle.

Figure 6:
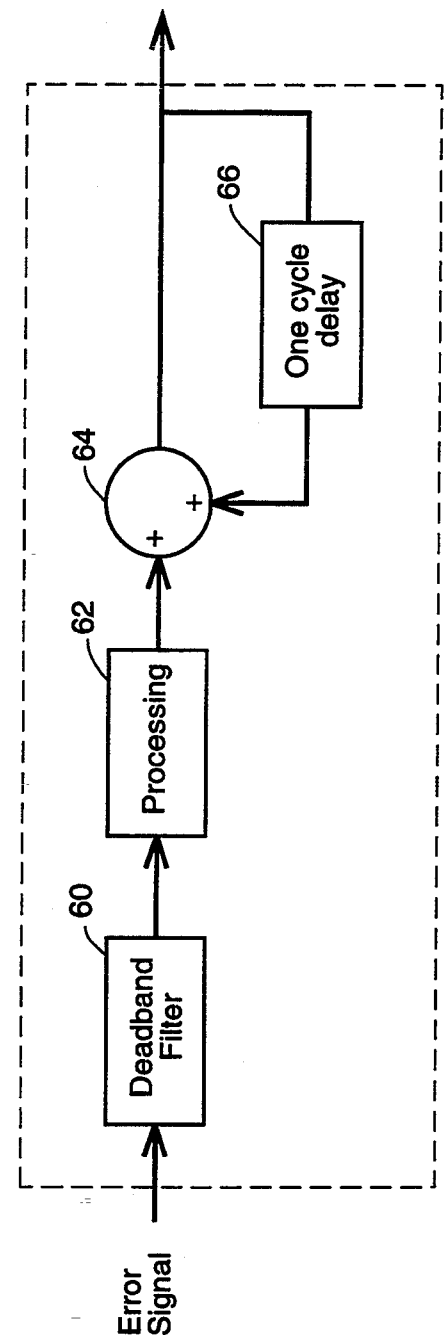
FIG. 6 illustrates the application of pressure to the brake of a controlled wheel by use of primary pressure apply pulses according to a preferred embodiment of the present invention.

FIG. 6 illustrates how the pulse width scaling factor computation in block 52 may be performed. The error signal, that is the difference calculated in subtractor 50, is input to deadband filter 60, which only passes a non-zero output if the error signal exceeds a predetermined deadband value. The output of deadband filter 60 may then be further processed in block 62. This additional processing may be based upon, for example, the preceding tuner time, the peak acceleration of the wheel the vehicle speed, the pressure dump time and other parameters measured from the preceding ABS cycle. The processed output of block 62 is then added to the pulse width scaling factor from the previous ABS cycle in adder 64. In this way, a positive error signal (indicating that the tuner time exceeds the target time) will cause the scaling factor to be increased, while a negative error (indicating that the tuner time is shorter than the target time) will cause the scaling factor to be reduced.

Consequently, when the tuner time in the preceding ABS cycle is long, the antilock brake system according to the present invention increases the width of the pressure apply pulses, thereby increasing the rate of pressure application. This increased rate of pressure application tends to force the next tendency of the wheel to lock to occur more quickly, decreasing the tuner time in that cycle and bringing it closer to the target time. Conversely, when the tuner time in the preceding ABS cycle is short, the width of the apply pulses, and accordingly the rate of pressure application, is reduced. This reduced rate tends to force the next departure to occur later in time, lengthening that cycle's tuner time and bringing it closer to the target. Accordingly, by implementing such adaptive control, the antilock brake system can "tune" itself to achieve substantially constant tuner times throughout the stop, and from stop to stop.

Thus, the present invention, as described above, provides a unique approach to antilock brake control by regulating the pressure at a wheel using a parameter indicative of the actual behavior of the wheel, rather than parameters indicative of how the wheel was controlled. Because the actual behavior of the wheel in the preceding ABS cycle is monitored, its behavior in the present cycle can be more optimally controlled. In addition, the present invention provides for a greater flexibility in determining the commencement of pressure application within the ABS cycle, since the application of pressure can be commanded at any time, without the need to simultaneously coordinate such application with the beginning of the measurement of an observation quantity. Thus, this invention provides a substantial improvement over the prior art.

It is intended that the specification and examples be considered exemplary only, with the true scope and spirit of the invention being indicated by the following claims.

What is claimed is:

1. An antilock brake system for a vehicle having at least one wheel, said system comprising:
   brake means for selectively, controllably applying and relieving braking force to and from said wheel;
   first determination means for determining when said wheel exhibits a tendency to lock during application of braking force thereto by said brake means;
   second determination means for determining when said wheel recovers from its tendency to lock after relief of braking force therefrom by said brake means;
   clock means responsive to said second and first determination means for calculating a tuner time, which represents the time elapsed between
      (a) when said wheel recovers from its tendency to lock, as determined by said second determination means, and
      (b) when said wheel next exhibits a tendency to lock, as determined by said first determination means; and
   control means responsive to said clock means and also to said first determination means in an antilock brake control cycle, extending between successive occurrences of a tendency said wheel to lock, said control means controlling said brake means when said wheel exhibits a tendency to lock
      (a) initially, in a decreasing force phase, to relieve braking force, and
      (b) thereafter, in an increasing force phase, to increase braking force as a function of the tuner time measured by said clock means in a preceding antilock brake control cycle.

2. An antilock brake system according to claim 1, further comprising sensor means for monitoring a rotational speed of said wheel and for generating a wheel speed signal representative thereof.

3. An antilock brake system according to claim 2, wherein said first determination means is connected to said sensor means, said first determination means further including:
   reference speed generating means for generating a reference speed signal representing the speed of the vehicle; and slip signal generating means for generating a slip signal representing a difference between said reference speed signal and the wheel speed signal, said difference thereby indicating the wheel slip;

and wherein said first determination means determines that said wheel is exhibiting a tendency to lock when the wheel slip, as indicated by the slip signal, exceeds a slip threshold.

4. An antilock brake system according to claim 2, wherein said first determination means is connected to said sensor means, said first determination means further including:

deceleration signal generating means for generating a wheel deceleration signal from the wheel speed signal;

and wherein said first determination means determines that said wheel is exhibiting a tendency to lock when the wheel deceleration, as indicated by the wheel deceleration signal, exceeds a deceleration threshold.

5. An antilock brake system according to claim 3, wherein said second determination means is connected to said sensor means, said second determination means further including:

acceleration signal generating means for generating a wheel acceleration signal from the wheel speed signal, wherein said second determination means determines that said wheel has recovered from a tendency to lock when the wheel stops accelerating, as indicated by the wheel acceleration signal.

6. An antilock brake system according to claim 4, wherein said second determination means is connected to said sensor means, said second determination means further including:

acceleration signal generating means for generating a wheel acceleration signal from the wheel speed signal, wherein said second determination means determines that said wheel has recovered from a tendency to lock when the wheel stops accelerating, as indicated by the wheel acceleration and signal.

7. An antilock brake system according to claim 1, said brake means comprising a pressurized fluid controlled brake device and fluid control valve means for selectively, controllably supplying, holding constant, and relieving supply of pressurized fluid to and from said brake device.

8. An antilock brake system according to claim 1, wherein said control means controls said brake means such that the increasing force phase comprises a primary stage during which the braking force is increased at a relatively rapid rate, and a secondary stage during which the braking force is increased at a more gradual rate.

9. An antilock brake system according to claim 7, wherein said control means controls said brake means such that the increasing force phase comprises a primary stage during which the braking force is increased at a relatively rapid rate, and a secondary stage during which the braking force is increased at a more gradual rate.

10. An antilock brake system according to claim 9, said control means generating during the primary apply stage at least one primary apply pulse to control said brake means to supply pressurized brake fluid to said brake device, the width of the primary pulse being varied by said control means as a function of the tuner time from the preceding antilock brake control cycle.

11. An antilock brake system according to claim 10, wherein said control means controls the width of the primary apply pulse to increase as the tuner time from the preceding antilock brake control cycle increases.

12. An antilock braking system according to claim 11, said control means calculating the width of the primary apply pulse in a present antilock brake control cycle by:

computing an error signal representing a difference between the tuner time from the preceding antilock brake control cycle and a predetermined target value;

computing a new scaling factor by adding the error signal to the scaling factor computed in the immediately preceding antilock brake control cycle; and multiplying the scaling factor by a base apply pulse width to determine the width of the primary apply pulse in the present antilock brake control cycle.

13. An antilock braking system according to claim 11, said control means calculating the width of the primary apply pulse in a present antilock brake control cycle by:

computing an error signal representing a difference between the tuner time from the preceding antilock brake control cycle and a predetermined target value;

computing a new scaling factor by adding the error signal to the scaling factor computed in the immediately preceding antilock brake control cycle; and adding the scaling factor to a base apply pulse width to determine the width of the primary apply pulse in the present antilock brake control cycle.

14. An antilock brake system according to claim 7, said control means generating during the increasing force phase at least two apply pulses to control said brake means to supply pressurized brake fluid to said brake device, the spacing between the two apply pulses being varied as a function of the tuner time from the preceding antilock brake control cycle.

15. An antilock brake system according to claim 14, wherein the spacing between the at least two apply pulses decreases as the tuner time from the preceding antilock brake control cycle increases.

16. A method for controlling a brake for a vehicle wheel, said method comprising the steps of:

selectively controllably applying and relieving braking force to and from said wheel:

determining when said wheel exhibits a tendency to lock during application of braking force thereto by said brake means;

determining when said wheel recovers from its tendency to lock after relief of braking force therefrom;

calculating a tuner time which represents the time elapsed between (a) when said wheel recovers from its tendency to lock, as determined in said second determining step, and (b) when said wheel next exhibits a tendency to lock, as determined in said first determining step; and controlling the brake force at said wheel in an antilock brake control cycle, extending between successive occurrences of a tendency of said wheel to lock, said controlling step being initiated when said wheel exhibits a tendency to lock (a) initially, in a decreasing force phase, to relieve braking force and (b) thereafter, in an increasing force phase, to increase braking force as a function of the tuner time calculated in a preceding antilock brake control cycle.

17. A method according to claim 16, further comprising the steps of:
   monitoring the rotational speed of said wheel; and
   generating a wheel speed signal representative of the rotational speed of said wheel.

18. A method according to claim 17, further comprising the steps of:
   generating a reference speed signal representing a speed of the vehicle;
   generating a slip signal representing a difference between said reference speed signal and said wheel speed signal, said difference thereby indicating the wheel slip; and
   determining that said wheel is exhibiting a tendency to lock when the wheel slip, as indicated by the slip signal, exceeds a slip threshold.

19. A method according to claim 17, further comprising the steps of:
   generating a wheel deceleration signal from the wheel speed signal; and
   determining that said wheel is exhibiting a tendency to lock when the wheel deceleration, as indicated by the wheel deceleration signal, exceeds a deceleration threshold.

20. A method according to claim 18, further comprising the steps of:
   generating a wheel acceleration signal from the wheel speed signal; and
   determining that said wheel has recovered from a tendency to lock when the wheel stops accelerating, as indicated by the wheel acceleration signal.

21. A method according to claim 19, further comprising the steps of:
   generating a wheel acceleration signal from the wheel speed signal; and
   determining that said wheel has recovered from a tendency to lock when the wheel stops accelerating, as indicated by the wheel acceleration signal.

22. A method according to claim wherein the brake force at said wheel is controlled by selectively controllably supplying, holding constant and relieving a supply of pressurized brake fluid to a brake device associated with said wheel.

23. A method according to claim 16, wherein the increasing force phase comprises a primary stage during which the braking force is increased at a relatively rapid rate, and a secondary stage during which the braking force is increased at a more gradual rate.

24. A method according to claim 22, wherein the increasing force phase comprises a primary stage during which the braking force is increased at a relatively rapid rate, and a secondary stage during which the braking force is increased at a more gradual rate.

25. A method according to claim 24, wherein at least one primary apply pulse is generated during the primary apply stage to increase the braking force, the width of the primary pulse being varied as a function of the tuner time from the preceding antilock brake control cycle.

26. A method according to claim 25, wherein the width of the primary apply pulse increases as the tuner time from the preceding antilock brake control cycle increases.

27. A method according to claim 26, wherein the width of the primary apply pulse in a present antilock brake control cycle is determined by:
   computing an error signal representing a difference between the tuner time from the preceding antilock brake control cycle and a predetermined target value;
   computing a new scaling factor by adding the processed error signal to the scaling factor computed in the immediately preceding antilock control cycle; and
   multiplying the scaling factor by a base apply pulse width to determine the width of the primary apply pulse in the present antilock brake control cycle.

28. A method according to claim wherein the width of the primary apply pulse in a present antilock brake control cycle is determined by:
   computing an error signal representing a difference between the tuner time from the preceding antilock brake control cycle and a predetermined target value;
   computing a new scaling factor by adding the processed error signal to the scaling factor computed in the immediately preceding antilock control cycle; and
   adding the scaling factor to a base apply pulse width to determine the width of the primary apply pulse in the present antilock brake control cycle.

29. A method according to claim 22, wherein at least two apply pulses are generated during the increasing force phase to increase the brake force, the spacing between the two apply pulses being varied as a function of the tuner time from the preceding antilock brake control cycle.

30. A method according to claim 29, wherein the spacing between the apply pulses decreases as the tuner time from the preceding antilock brake control cycle increases.

* * * * *